US009048552B2

(12) United States Patent
Eyles et al.

(10) Patent No.: US 9,048,552 B2
(45) Date of Patent: Jun. 2, 2015

(54) CONNECTOR FOR MAKING AN ELECTRICAL CONNECTION BETWEEN TWO PLATES

(75) Inventors: Jonathan Mark Eyles, Swindon (GB); Paul Gillie, Swindon (GB); Daniel Bodio, Swindon (GB)

(73) Assignee: Tyco Electronics UK Ltd, Swindon, Wiltshire (GB)

( * ) Notice: Subject to any disclaimer, the term of this patent is extended or adjusted under 35 U.S.C. 154(b) by 128 days.

(21) Appl. No.: 13/876,805

(22) PCT Filed: Sep. 21, 2011

(86) PCT No.: PCT/GB2011/051779
§ 371 (c)(1), (2), (4) Date: Mar. 28, 2013

(87) PCT Pub. No.: WO2012/042244
PCT Pub. Date: Apr. 5, 2012

(65) Prior Publication Data

US 2013/0186684 A1 Jul. 25, 2013

(30) Foreign Application Priority Data

Sep. 29, 2010 (GB) .................................. 1016349.1

(51) Int. Cl.
*H01R 29/00* (2006.01)
*H02B 1/056* (2006.01)
*H01R 4/48* (2006.01)
(Continued)

(52) U.S. Cl.
CPC ................ *H01R 4/48* (2013.01); *H01R 12/523* (2013.01); *H01R 13/17* (2013.01)

(58) Field of Classification Search
CPC ......... H01R 4/48; H01R 12/523; H01R 13/17
USPC .................................. 439/43, 271; 174/84 R
See application file for complete search history.

(56) References Cited

U.S. PATENT DOCUMENTS 3,028,573 A 4/1962 Stoehr
5,456,608 A 10/1995 Rogers et al.
(Continued)

FOREIGN PATENT DOCUMENTS

EP 0 649 204 A1 4/1995
WO WO 03/067713 A1 8/2003

OTHER PUBLICATIONS

International Preliminary Report on Patentability issued by The International Bureau of WIPO, Geneva, Switzerland, dated Apr. 2, 2013, for related International Application No. PCT/GB2011/051779; 6 pages.

(Continued)

*Primary Examiner* — Javaid Nasri
(74) *Attorney, Agent, or Firm* — Faegre Baker Daniels LLP

(57) ABSTRACT

A connector (100) for making an electrical connection between two plates (110, 120) that are mechanically secured to one another, the connector comprising a first socket (50) for fixing to a first plate (110), a second socket (60) for fixing to a second plate (120), and a connector pin (150), the first and second sockets both comprising an aperture (55, 65) for receiving the connector pin (150), wherein the connector further comprises a first spring (161) for contacting between the connector pin and the first socket, and a second spring (162) for contacting between the connector pin and the second socket.

33 Claims, 3 Drawing Sheets

(51) Int. Cl.

| | |
|---|---|
| ***H01R 12/52*** | (2011.01) |
| ***H01R 13/17*** | (2006.01) |

(56) References Cited

U.S. PATENT DOCUMENTS 5,544,004 A * 8/1996 Inagaki et al. ................ 361/633
2001/0030521 A1 10/2001 Hard et al.
2004/0137771 A1* 7/2004 Schumacher ................. 439/121

OTHER PUBLICATIONS

International Search Report and Written Opinion issued by the European Patent Office, dated Nov. 10, 2011, for related International Application No. PCT/GB2011/051779; 11 pages.

* cited by examiner

CONNECTOR FOR MAKING AN ELECTRICAL CONNECTION BETWEEN TWO PLATES

The present invention relates to a connector for making an electrical connection between two plates that are mechanically secured to one another.

The requirements for mechanically connecting two plates typically differ from the requirements for electrically connecting them. A mechanical connection needs to be strong and resist relative movement between the plates, whereas an electrical connection needs to provide a reliable, low resistance electrical path between the plates. The long term functional requirements of the electrical connection may not always be compatible with the ageing characteristics of the mechanical connection, for example due to load induced stresses within the mechanical joint interface.

Connector systems for aerospace applications need to be lightweight and very robust to cope with the harsh environmental conditions present on aircraft. A single aircraft may require a huge number of electrical connections, and so another important consideration is speed and accuracy of installation. Connectors for aerospace applications commonly attempt to minimise the possibility of human error leading to faults during installation.

One such aerospace application is in joining the various plates of aircraft together, where the connections need to provide a low resistance electrical path to meet electrical grounding requirements. To ensure an electrical connection, known methods of connecting plates comprise making a mechanical connection to secure the plates to one another, and then making a separate electrical connection using a bonding strap. The addition of the bonding straps adds significant extra weight to the aircraft and is time consuming.

It is therefore an aim of the invention to provide an improved connector.

According to an embodiment of the invention, there is provided a connector for making an electrical connection between two plates that are mechanically secured to one another. The connector comprises a first socket for fixing to a first plate, a second socket for fixing to a second plate, and a connector pin. The first and second sockets both comprise an aperture for receiving the connector pin, wherein the connector further comprises a first spring for contacting between the connector pin and the first socket, and a second spring for contacting between the connector pin and the second socket.

The connector pin and the first and second springs make an electrical connection between the first and second sockets, electrically joining the first and second plates to one another. Since the electrical connection is decoupled from the mechanical connection, the electrical connection is not significantly affected by the effects of stress on the mechanical joint.

The connector may comprise a seal extending around the axis of the connector pin, the seal axially located between the axial locations of the first and second springs. The seal may help prevent any debris from the interface between the two plates or sockets from reaching the first and/or second springs. Furthermore, the seal may contact both of the two plates, and/or both the first and second sockets, and seal the interface of the two plates/sockets away from the remainder of the connector pin.

Advantageously, the first spring may be a first coiled spring and the second spring may be a second coiled spring. The connector pin may comprise a first groove extending around the axis of the connector pin and for supporting the first coiled spring, and a second groove extending around the axis of the connector pin and for supporting the second coiled spring.

The first and second sockets may have holes for fixing the first and second sockets to the first and second plates using rivets. Alternatively, the first socket may be integrally formed with one of the two plates, and the second socket may be integrally formed with the other of the two plates.

The mechanical securing of the plates may comprise a hole of the first socket and a hole of the second socket being arranged to receive a rivet through a hole of the plates. Alternately, the plates may be mechanically secured by another means that is separate from the first and second sockets, for example by rivets, bolts, adhesive etc.

The plates may be mechanically secured in physical contact with one another, and whilst this typically results in an electrical connection between the electrically conductive plates, the addition of the connector pin provides a more reliable electrical connection that is de-coupled from the effects of degradation at the mechanical interface between the two plates.

The plates may be two planar plates that are mechanically secured together, the first and second sockets housing the connector pin with the connector pin being substantially perpendicular to the plane of the planar connector plates. The connector pin may pass through an aperture of the plates.

The connector may comprise one or more additional grooves extending around the axis of the connector pin and for supporting one or more O-rings. The O-rings may provide a seal to help protect the springs from external environmental conditions, for example to help keep the coiled spring and associated contact areas of the connector pin and socket free from contamination and dirt or debris. In particular, the connector pin may have first and second additional grooves for supporting first and second O-rings respectively, and the first and second springs may both be axially in between the first and second additional grooves such that the first and second springs are sealed away between the first and second O-rings.

Embodiments of the invention will now be described with reference to the accompanying drawings, in which.

Figure 1:
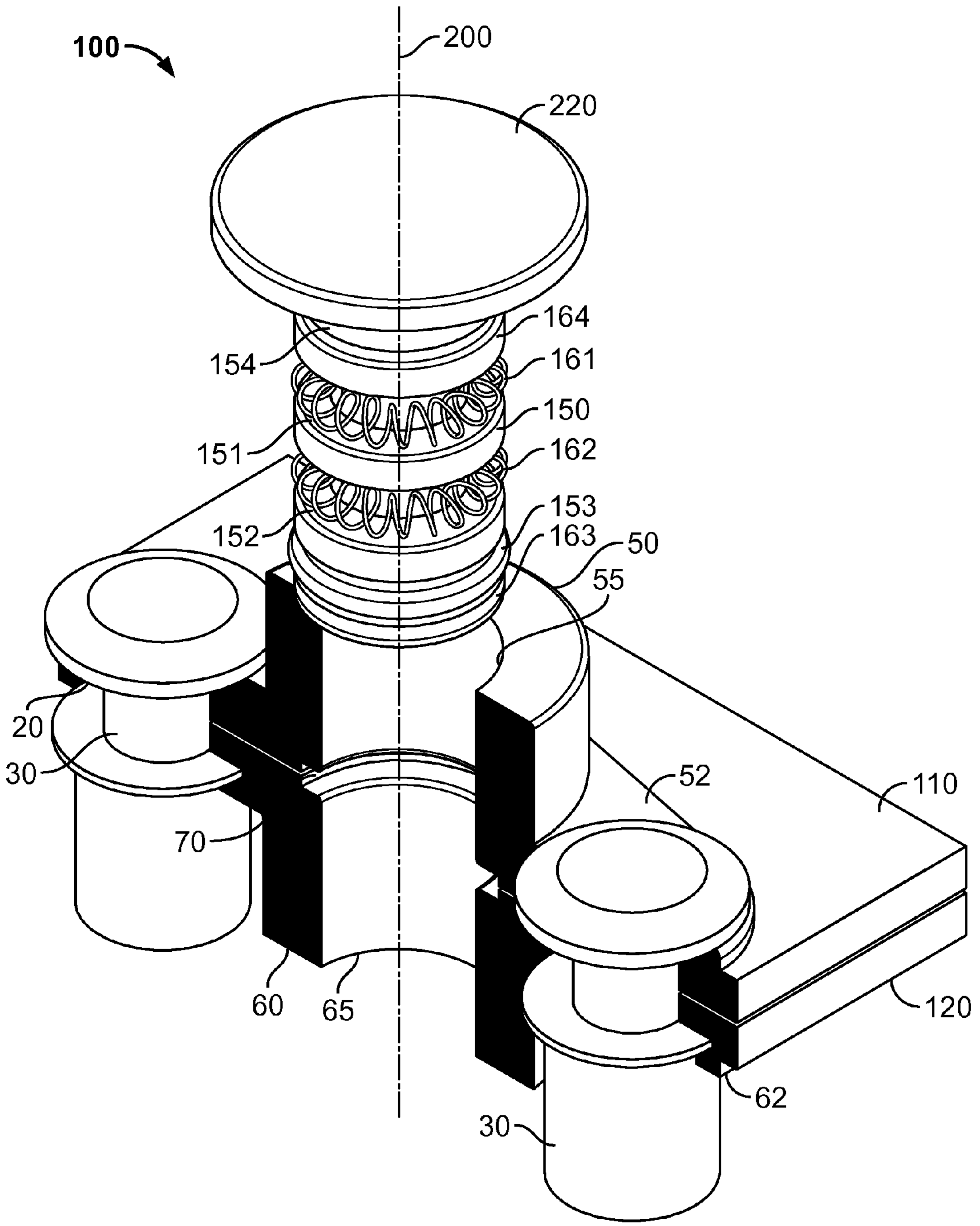
FIG. 1 shows a schematic perspective diagram of a connector according to a first embodiment of the invention, prior to insertion of a connector pin.

The schematic diagram of FIG. 1 shows a connector 100 comprising a first socket 50, a second socket 60, and a connector pin 150. The connector 100 is for mechanically and electrically joining a first plate 110 and a second plate 120 together. One half of the first and second plates and the first and second sockets has been cut away for clarity.

The first socket 50 is shown fixed to the first plate 110 and the second socket 60 is shown fixed to the second plate 120 by two rivets 30. The rivets 30 pass though holes 20 of the first and second sockets, and also pass through holes 25 (see FIG. 2) of both the first and second plates, and so join the plates together.

The first and second sockets 50 and 60 each comprise respective apertures 55 and 65, and the first and second plates comprise an aperture 70 extending through both of the plates. The connector pin 150 is shown in a state ready to be inserted through the apertures 55, 65, and 70 to make an electrical connection between the sockets.

The connector 100 comprises first and second coiled springs 161 and 162, which are supported in first and second grooves 151 and 152 of the connector pin 150. The first and second grooves extend around the axis 200 of the connector pin, and provide electrical contact surfaces for the coiled springs. The electrical contact surfaces may be conductively plated to reduce electrical resistance between the connector pin and the coiled springs. The coiled springs may be silver plated to help improve the electrical properties of the springs and guard against corrosion, and may for example be a silver plated beryllium copper canted coil springs.

The connector 100 also comprises first and second O-rings 153 and 154 which are supported in first and second additional grooves 163 and 164 of the connector pin 150. The first and second additional grooves extend around the axis 200 of the connector pin, and enable the O-rings to form a seal between the connector pin 150 and the apertures 55 and 65 of the first and second sockets once the connector pin is inserted into the apertures.

Figure 2:
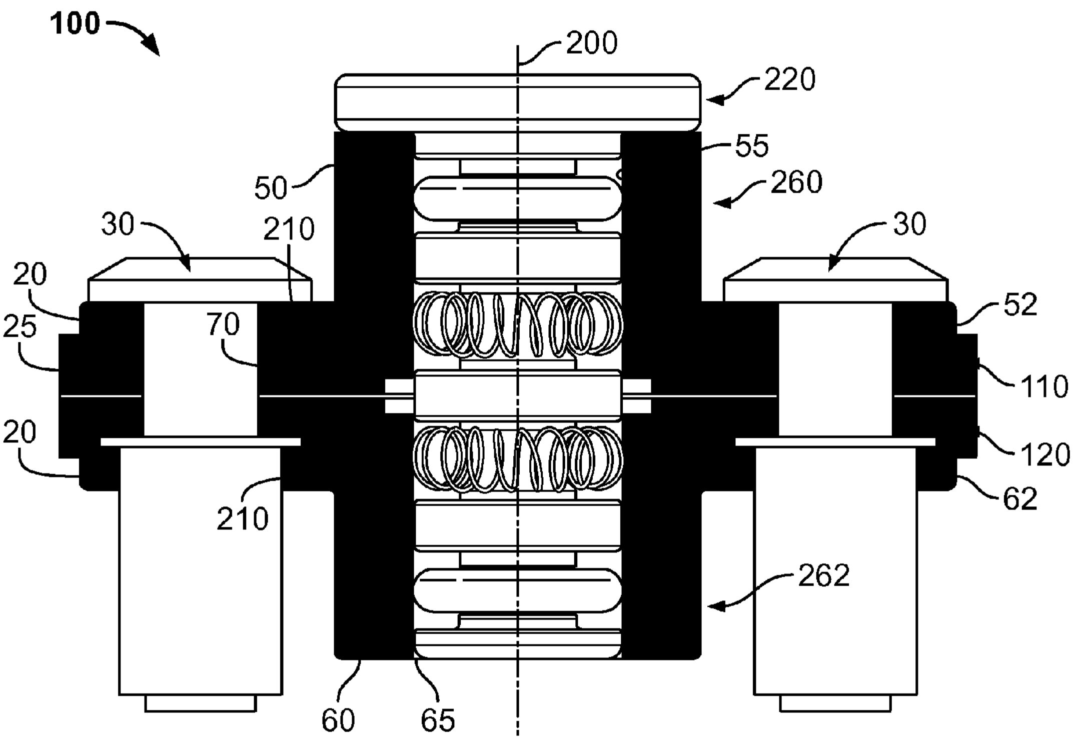
FIG. 2 shows a schematic cross-sectional diagram of the connector of FIG. 1 after the insertion of the connector pin.

FIG. 2 shows a schematic cross-sectional diagram of the connector 100 after the connector pin 150 has been inserted into the apertures 55, 65, 70. The first coiled spring 151 contacts the first socket 50, and the second coiled spring 152 contacts the second socket 60. The O-rings seal the coiled springs away from the outside environment. A mechanical connection is made between the plates by rivets 30 that sandwich the plates between the sockets 50 and 60, and an electrical connection is made between the plates by sockets 50 and 60, the sockets 50 and 60 being electrically connected to one another by the coiled springs 161 and 162, and the connector pin.

In this embodiment, the apertures 55 and 65 are both open-ended, although in an alternate embodiment the aperture 65 of the second socket has a closed end to assist with environmental sealing.

The connector pin 150 comprises a head 220 at one end of the connector pin, the head being wider than the aperture of the first socket. The head can assist in ensuring quick and correct longitudinal positioning of the connector pin within the apertures 55, 65, 70. In an alternate embodiment, the second additional groove 163 and corresponding O-ring 154 may be omitted, and the head 220 may be relied upon to provide sufficient sealing. The head 220 may be equipped with a sealing means to help improve the level of sealing offered by the head.

Each socket comprises a ridge 210 extending around the axis 200 of the aperture of the socket, the ridge for inserting inside the aperture 70 of the plates. Thus, the width of the apertures 55 and 65 of the sockets are less than the width of the aperture 70 of the plates. The ridges may help improve the stability of the mechanical joint and/or help reduce the length of the connector pin by the coiled springs being able to be placed closer to one another. The contact area between the sockets and the plates is also increased by the ridges, helping to minimise the electrical resistance between them.

The first and second sockets 50 and 60 also comprise respective perpendicular portions 260 and 262, which form the sidewalls of at least part of the axial length of the apertures 55 and 65. The perpendicular portions extend perpendicular to the plates 110 and 120, and house the connector pin 150. The inside surfaces of the perpendicular sections contacting the coiled springs may be conductively plated to improve the electrical connection between the coiled springs and the sockets 50 and 60.

Figure 3:
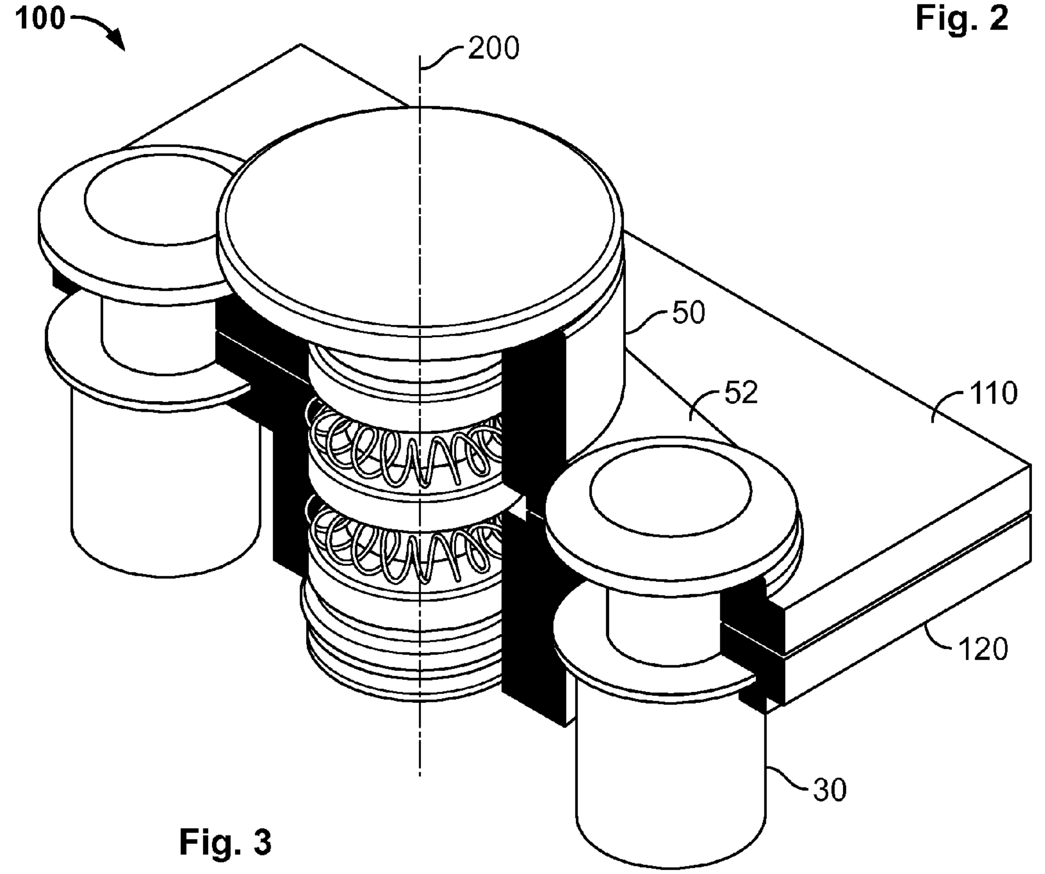
FIG. 3 shows a schematic perspective diagram of the connector of FIG. 1 after the insertion of the connector pin.

Furthermore, the first and second sockets 50 and 60 also comprise respective planar portions 52 and 62. The planar portions 52 and 62 lie either side of the plates 110 and 120, sandwiching the plates together, and providing an electrical contact between the sockets and the plates. A perspective diagram of the connector 100 after insertion of the connector pin 150 is shown in FIG. 3, wherein the planar portion 52 of the first socket 50 can be easily seen.

In this embodiment, the connector pin 150 and the apertures 55, 65, 70 are circular, although other cross-sectional shapes such as triangles or rectangles are also possible. The circular shape can help reduce installation time since it enables the connector pin to be inserted at any rotational orientation.

The ability to make a mechanical connection (in this embodiment using the rivets 30) and subsequently make an electrical connection using the connector pin 150, enables the electrical connections to be made at a later manufacturing stage than the mechanical connections if desired.

In this embodiment, each rivet 30 fixes the first socket to the first plate, the second socket to the second plate, and the first and second plates to one another, saving weight and reducing installation time. Alternately, different rivets may be used to secure different ones of the first and second sockets and the first and second plates together. For example, the plates may be secured together by rivets that do not pass through the first and second sockets. Furthermore, in still further embodiments the plates and/or sockets may be secured by other means such as gluing or welding.

Figure 4:
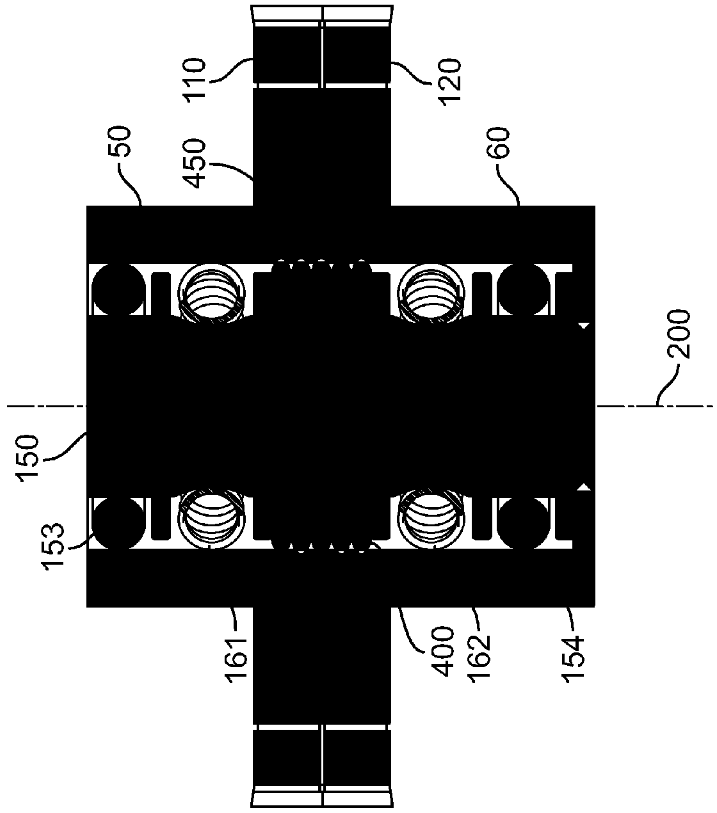
FIG. 4 shows schematic diagram of a connector according to a second embodiment of the invention.

A second embodiment of the invention will now be described with reference to FIG. 4. The second embodiment is similar to the first embodiment and includes first and second sockets 50 and 60 that are fixed to plates 110 and 120, and that are electrically connected by connector pin 150. The sockets 50 and 60 of the second embodiment are fixed to the plates 110 and 120 by integrally forming the sockets with the plates. The first and second sockets (50, 60) are in physical contact with one another and the two plates (110, 120) are also in physical contact with one another.

The connector of the second embodiment further includes a seal 400 extending around the axis of the connector pin for contacting both of the first and second sockets 50, 60. The seal acts to seal the springs 161, 162 away from any debris present at the interface 450 between the two sockets, helping maintain the reliability of the electrical connections made by the springs.

In this embodiment, the seal 400 contacts both of the first and second sockets, although in an alternate embodiment the first and second sockets sandwich the two plates and the seal 400 contacts both of the two plates. In a further alternate embodiment, the first and second sockets sandwich the two plates and the seal 400 is axially long enough to contact both of the two plates and both of the first and second sockets.

In this embodiment the seal is a piston seal 400 that is located in a further groove of the connector pin, although other types of seal and means of locating the seal are also possible, for example the seal 410 described below in relation to the third embodiment.

Figure 5:
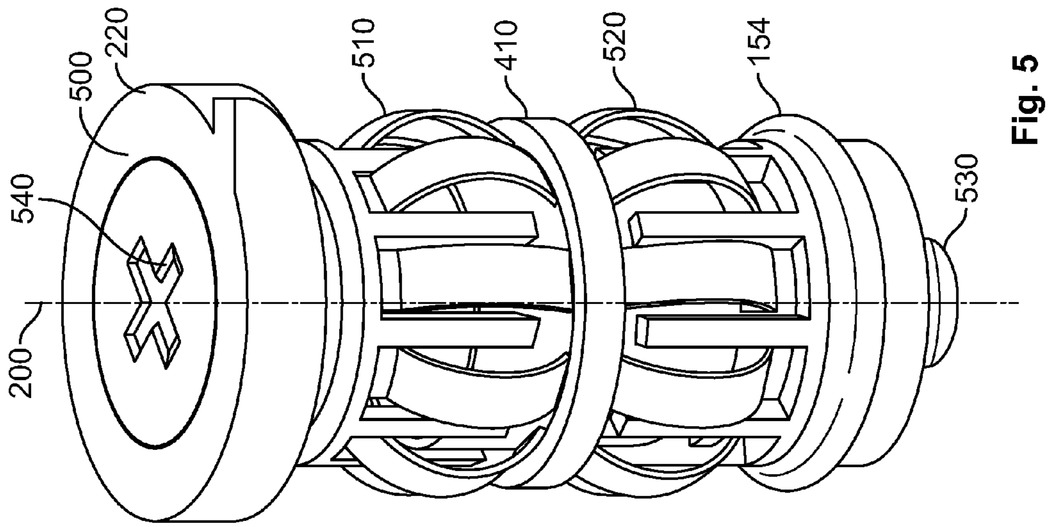
FIG. 5 shows schematic diagram of a connector pin according to a third embodiment of the invention.

FIG. 5 shows a schematic diagram of a connector pin 500 according to a third embodiment. The connector pin 500 may be used in place of the connector pin 150 of the first and second embodiments. The connector pin is fitted with a first spring 510 for contacting between the connector pin and the first socket, and a second spring 520 for contacting between the connector pin and the second socket. The first spring 510 is aligned with the axis 200 of the connector pin and can be compressed inwardly towards the connector pin, and the second spring 520 is also aligned with the axis of the connector pin and can also be compressed inwardly towards the connector pin. The inward compression of the first and second springs occurs upon insertion of the contact pin into the apertures of the first and second sockets and helps assure that the springs make a good electrical connection between the connector pin and the sockets.

In this embodiment there are multiple first springs 510 equally spaced around the axis 200 of the connector pin, and multiple second springs 520 equally spaced around the axis 200 of the connector pin. The presence of multiple first (or second) springs helps balance the forces exerted by the springs on the connector pin. In an alternate embodiment, only one first spring 510 and one second spring 520 is present.

There is a seal 410 axially located between the axial locations of the first and second springs along the axis 200 of the connector pin, and which is intended for contacting both the first and second sockets and/or both the first and second plates. The seal is an annular ring having a flat external profile for contacting both the first and second sockets and/or both the two plates.

The connector pin 500 has a head 220, the width of the head being larger than the width of the remainder of the connector pin. The connector pin also has a screw thread 530 for screwing into a corresponding screw thread of the second socket. The head 220 comprises an aperture 540 enabling the connector pin to be screwed into the first and second sockets using a tool such as a screwdriver. Alternately, the head 220 may snap-fit into the first socket such that the screw threads are not required.

The scope of the invention is defined by the appended independent claim(s). Further features appearing in the dependent claims and the description are optional, and may or may not be implemented in various embodiments of the invention which will be apparent to those skilled in the art.

The invention claimed is:

1. A connector for making an electrical connection between two plates that are mechanically secured to one another, the connector comprising a first socket for fixing to a first plate, a second socket for fixing to a second plate, and a connector pin, the first and second sockets both comprising planar portions having a contacting surface for making an electrical connection with the associated plate, and an aperture for receiving the connector pin, wherein the connector further comprises a first spring for contacting between the connector pin and the first socket, and a second spring for contacting between the connector pin and the second socket.

2. The connector of claim 1, wherein the two plates are mechanically secured in physical contact with one another.

3. The connector of claim 1, comprising a seal extending around an axis of the connector pin, the seal axially located between axial locations of the first and second springs.

4. The connector of claim 1, wherein the first and second sockets comprise holes for fixing the first and second sockets to the first and second plates by rivets.

5. The connector of claim 4, wherein a hole of the first socket and a hole of the second socket are arranged to receive a rivet through a hole of the plates.

6. The connector claim 1, wherein the first and second sockets each comprise a ridge extending around the axis of the aperture of the socket, the ridges for inserting inside an aperture of the plates.

7. The connector claim 1, wherein the planar portions are arranged for sandwiching the plates between the planar portions.

8. The connector of claim 1, wherein the first socket is fixed to one of the two plates by integrally forming the first socket with the one of the two plates.

9. The connector of claim 8, wherein the second socket is fixed to the other of the two plates by integrally forming the second socket with the other of the two plates.

10. The connector of claim 1, wherein the first and second sockets comprise perpendicular portions forming sidewalls of at least part of the axial length of the apertures, the perpendicular portions arranged for extending perpendicular to the plates and for housing the connector pin.

11. The connector of claim 1, wherein the connector pin further comprises a head at one end of the connector pin, the head being wider than the aperture of the first socket.

12. The connector of claim 11, wherein the connector pin further comprises a screw thread at another end of the connector pin, and wherein the second socket comprises a corresponding screw thread for receiving the screw thread of the connector pin.

13. The connector of claim 1, wherein the first spring is a first coiled spring and the second spring is a second coiled spring, and wherein the connector pin comprises:

a first groove extending around the axis of the connector pin and for supporting the first coiled spring;

a second groove extending around the axis of the connector pin and for supporting the second coiled spring.

14. The connector of claim 1, wherein the first spring is aligned with the axis of the connector pin and can be compressed inwardly towards the connector pin, and wherein the second spring is aligned with the axis of the connector pin and can be compressed inwardly towards the connector pin.

15. The connector of claim 14, wherein the first spring is one of multiple first springs, the multiple first springs being equally spaced around the axis of the connector pin, and wherein the second spring is one of multiple second springs, the multiple second springs being equally spaced around the axis of the connector pin.

16. The connector claim 1, wherein the connector further comprises a first additional groove extending around the axis of the connector pin and a first O-ring within the first additional groove.

17. The connector of claim 16, wherein the connector further comprises a second additional groove extending around the axis of the connector pin and a second O-ring within the second additional groove, and wherein the first and second additional grooves are axially spaced apart by the first and second springs.

18. Two plates that are mechanically secured in physical contact with one another and a connector making an electrical connection between the two plates, the connector comprising a first socket fixed to a first plate, a second socket fixed to a second plate, and a connector pin, the first and second sockets both comprising an aperture for receiving the connector pin, wherein the connector further comprises a first spring for contacting between the connector pin and the first socket, and a second spring for contacting between the connector pin and the second socket.

19. The two plates and connector of claim 18, comprising a seal extending around an axis of the connector pin, the seal axially located between axial locations of the first and second springs.

20. The two plates and connector of claim 18, wherein the first and second sockets comprise holes for fixing the first and second sockets to the first and second plates by rivets.

21. The two plates and connector of claim 20, wherein a hole of the first socket and a hole of the second socket are arranged to receive a rivet through a hole of the plates.

22. The two plates and connector of claim 18, wherein the first and second sockets each comprise a ridge extending around the axis of the aperture of the socket, the ridges for inserting inside an aperture of the plates.

23. The two plates and connector of claim 18, wherein the first and second sockets each comprise a planar portion, the planar portions arranged for sandwiching the plates between the planar portions.

24. The two plates and connector of claim 18, wherein the first socket is fixed to one of the two plates by integrally forming the first socket with one of the two plates.

25. The two plates and connector of claim 24, wherein the second socket is fixed to the other of the two plates but integrally forming the second socket with the other two plates.

26. The two plates and connector of claim 18, wherein the first and second sockets comprise perpendicular portions forming the sidewalls of at least part of an axial length of the apertures, the perpendicular portions arranged extending perpendicular to the plates and for housing of the connector pin.

27. The two plates and connector of claim 18, wherein the connector pin further comprises a head at one end of the connector pin, the head being wider than the aperture of the first socket.

28. The two plates and connector of claim 27, wherein the connector pin further comprises a screw thread at the other end of the connector pin, and wherein the second socket comprises a corresponding screw thread for receiving the screw thread of the connector pin.

29. The two plates and connector of claim 18, wherein the first spring is a first coiled spring and the second spring is a second coiled spring, and wherein the connector pin comprises:

a first groove extending around an axis of the connector pin and for supporting the first coiled spring; and a second groove extending around the axis of the connector pin and for supporting the second coil spring.

30. The two plates and connector of claim 18, wherein the first spring is aligned with an axis of the connector pin and can be compressed inwardly towards the connector pin, and wherein the second spring is aligned with the axis of the connector pin and can be compressed inwardly towards the connector pin.

31. The two plates and connector of claim 30, wherein the first spring is one of multiple first springs, the multiple first springs being equally spaced around the axis of the connector pin, and wherein the second spring is one of multiple second springs, the multiple second springs being equally spaced around the axis of the connector pin.

32. The two plates and connector of claim 18, wherein the connector further comprises a first additional groove extending around an axis of the connector pin and a first O-ring within the first additional groove.

33. The two plates and connector of claim 32, wherein the connector further comprises a second additional groove extending around the axis of the connector pin and a second O-ring within the second additional groove, and wherein the first and second additional grooves are axially spaced apart by the first and second springs.

* * * * *